United States Patent [19]

Takahashi et al.

[11] 4,136,237
[45] Jan. 23, 1979

[54] PROCESS FOR PREPARING CATION-EXCHANGE MEMBRANE BY POLYMERIZING LACTONE RING CONTAINING UNSATURATED MONOMER IN THE PRESENCE OF FLUORINATED POLYMER

[75] Inventors: Kenji Takahashi; Toru Seita; Shunichi Asami; Akihiko Shimizu, all of Shin-nanyo, Japan

[73] Assignee: Toyo Soda Manufacturing Co., Ltd., Yamaguchi, Japan

[21] Appl. No.: 824,225

[22] Filed: Aug. 12, 1977

[30] Foreign Application Priority Data

Sep. 14, 1976 [JP] Japan ................................ 51/109346

[51] Int. Cl.$^2$ .................... C25B 13/00; C08L 31/02
[52] U.S. Cl. ...................................... 521/27; 204/296
[58] Field of Search ................. 260/2.2 R, 885; 54/27

[56] References Cited

U.S. PATENT DOCUMENTS

| 2,500,265 | 3/1950 | Walling | 260/885 |
| 3,257,334 | 6/1966 | Chen et al. | 204/296 |

FOREIGN PATENT DOCUMENTS

| 250282 | 8/1960 | Australia | 204/296 |
| 120492 | 9/1975 | Japan | 260/2.2 R |
| 108182 | 8/1977 | Japan | 260/2.2 R |

OTHER PUBLICATIONS

Advanced Organic Chemistry–J. March, McGraw-Hill Book Company, 1968, pp. 309–312.
Journal of Amer. Chem. Soc., pp. 3267–3273, vol. 72, Jul. 1970, Long et al.

Primary Examiner—Joseph L. Schofer
Assistant Examiner—Peter F. Kulkosky
Attorney, Agent, or Firm—Oblon, Fisher, Spivak, McClelland & Maier

[57] ABSTRACT

A cation-exchange membrane is prepared by immersing a monomer having lactone ring and/or a lactonizable monomer with or without a crosslinking agent or a polymerization initiator, into a fluorinated polymer membrane having cation-exchangeable groups and polymerizing the monomer.

8 Claims, No Drawings

PROCESS FOR PREPARING CATION-EXCHANGE MEMBRANE BY POLYMERIZING LACTONE RING CONTAINING UNSATURATED MONOMER IN THE PRESENCE OF FLUORINATED POLYMER

BACKGROUND OF THE INVENTION

1. Field of the Invention

The present invention relates to a process for preparing a cation-exchangeable membrane which has excellent electrical characteristics and cation selective permeability, chemical resistance, heat resistance and mechanical strength. More particularly, it relates to a process for preparing a cation-exchange membrane which is suitable as a diaphragm for electrolysis of an alkali metal halide.

2. Description of the Prior Art

Cation-exchange membranes have been used in various industries because of cation selective permeability.

For example, the cation-exchange membranes have been used as a diaphragm for electrodialysis by combining it with an anion-exchange membrane or a neutral diaphragm in order to concentrate sea water for producing sodium chloride or to desalt from brine water or sea water for producing fresh water or to recover useful metal salt from a plating waste solution or to treat a drainage in high level or to concentrate and to recover an organic acid or to purify saccharides etc.

They have been also used as a diaphragm for electrode reaction in a fuel battery, or in a dimerization or acrylonitrile to obtain adiponitrile etc.

Various characteristics have been required for using the cation-exchange membrane to these usages. The most important characteristics except special case, are cation selective permeability and durability.

In order to improve the cation selective permeability and the durability, various efforts have been made after finding the ionexchange membranes. As the results, many membranes of made styrene-divinyl benzene type polymers having sulfonic acid groups have been developed as cation-exchange membrane to supply the cation-exchange membranes having satisfactory cation selective permeability and durability.

The condition using the cation-exchange membranes becomes severe as it is found in the treatments of drainages and waste solutions or the electrolysis of sodium chloride. It has been further required to improve the durability of the membranes. The cation selective permeability of the conventional cation-exchange membrane should be further improved.

Although the conventional cation-exchange membranes have excellent blocking property to the permeation of many anions however, the mobility of cations has been remarkably low in an electrolyte solution containing hydroxyl group ions in comparison with the other cases.

The phenomenon is caused because the permeation of hydroxyl group ions can not be effectively prevented as the mobility of hydroxyl group ions in an aqueous solution is remarkably high in comparison with the other anions.

When the cation-exchange membrane is used in the condition containing hydroxyl group ions, for example it is used as a diaphragm for electrolysis of sodium chloride, the current efficiency is lowered disadvantageously because of the phenomenon.

Accordingly, it has been required to develop a cation-exchange membrane having high durability and high resistance to permeation of hydroxyl group ions in these usages of the cation-exchange membrane.

The inventors have studied to develop the cation-exchange membrane for satisfying the requirement of the durability and the permeation of hydroxyl group ions.

SUMMARY OF THE INVENTION

It is an object of the present invention to provide a process for preparing a cation-exchange membrane which has high durability, high selective permeability and low electric resistance.

The foregoing and other objects of the present invention have been attained by immersing a monomer having lactone ring and/or a lactonizable monomer with or without a crosslinking agent or a polymerization initiator, into a fluorinated polymer membrane having cation-exchangeable groups of sulfonic acid groups and/or carboxylic acid groups and polymerizing the monomer.

The cation-exchange membrane having smaller resistance for permeations can be prepared by swelling the fluorinated polymer membrane with a water miscible organic solvent and then removing the solvent from the membrane before immersing the monomer.

The cation-exchange membrane having lower electric resistance and higher mobility of cations can be prepared by swelling the membrane with a water miscible organic solvent and then removing the solvent from the membrane after immersing and polymerizing the monomer.

DETAILED DESCRIPTION OF THE PREFERRED EMBODIMENTS

The processes for treating cation-exchange membranes by immersing a vinyl monomer with or without a crosslinking agent into the membranes and polymerizing it, have been disclosed in Japanese Unexamined Patent Publication Nos. 108182/1975, 120492/1975, and 24995/1977. These cation-exchange membranes have improved current efficiency however the electric resistance of the membrane have been remarkably increased.

When the cation-exchange membranes have been used as the diaphragm for electrolysis, the electrolytic voltages have been increased to increase power units. Accordingly, they can not be optimum cation-exchange membranes.

The electric resistance of the cation-exchange membrane of the present invention is slightly higher or sometimes is lower than that of the fluorinated polymer membrane used as the matrix, whereas the mobility of the cations (transport number) of the cation-exchange membrane of the invention are remarkably higher than those of the conventional cation-exchange membranes whereby the power unit can be lowered. The cation-exchange membrane of the present invention are optimum. These effects are further improved by the treatment of the membrane by swelling it with a water miscible organic solvent and removing the solvent from the membrane.

The reason why the electric resistance of the cation-exchange membrane is decreased by immersing and polymerizing the monomer having lactone ring and/or the lactonizable monomer is not clear, however it is considered as follows.

After introducing the lactone rings in the fluorinated polymer membranes, the cation-exchange membranes are usually stored in an aqueous solution of sodium hydroxide. In the solution, the lactone rings cause cleavage of rings to form carboxylic acid groups and hydroxyl groups. The carboxylic acid groups are cation-exchangeable groups and the hydroxyl groups increase hydrophilic property. Thus, the introduction of the lactone rings causes to introduce the cation-exchangeable groups and the hydrophilic property. It is considered that the condition result the lower electric resistance and higher mobility of cations. The present invention is not intended to be limited by the description.

The fluorinated polymer membranes having sulfonic acid groups and/or carboxylic acid groups have been used in the preparation of the present invention.

The fluorinated polymer membranes can be prepared by polymerizing a perfluorocarbon monomer having a functional group which is or can be converted to sulfonic acid group and/or carboxylic acid group, with or without a comonomer and molding the fluorinated polymer in a form of membrane and if necessary hydrolyzing it.

Typical fluorinated polymers having cation-exchangeable groups have the following units. The units have groups which can be converted into cation-exchangeable groups.

A) Sulfonic acid type fluorinated polymers:

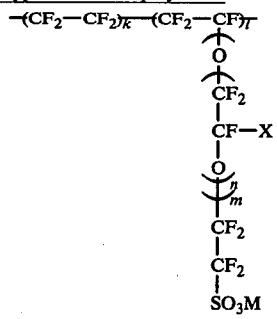

$X = -CF_3, -CF_2-O-CF_3$;
$n = 0$ or 1 to 5;
$m = 0$ or 1;
$k/l = 3-16$ preferably 5-13.
$M = H, NH_4$, or alkali metal such as Na, K.
such as;

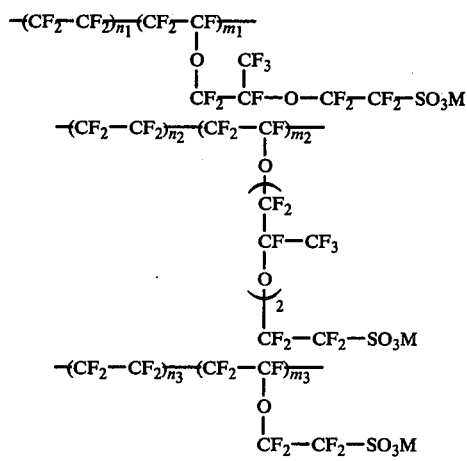    (1)
(2)
(3)

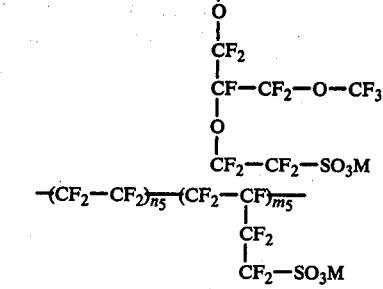   (4)

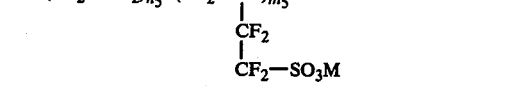   (5)

The copolymer have preferably sulfonic acid groups at a ratio of one per 700 to 2800 of molecular weight.

B) Carboxylic acid type fluorinated polymers:

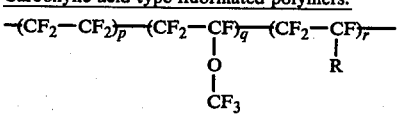

R represents
A,
$-O-(CF_2)_a A$,
$-O-(CF_2-CF-O)_b-(CF_2)_c A$, or
$\quad\quad\quad\quad\ \ |$
$\quad\quad\quad\quad\ CF_3$
$-(CF_2)_c-A$.

$a = 2$ to 4;
$b = 0$ or 1 to 5;
$c = 1$ to 5;
$A = -COOM$; M:H, or alkali metal such as Na, K.
$(p + q)/r = 0.5-19$ preferably 1-10.
such as;

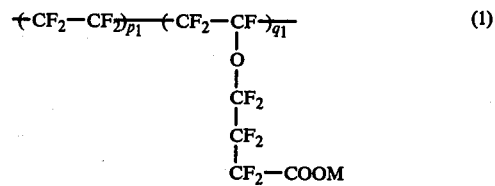   (1)

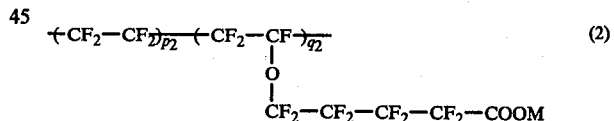   (2)

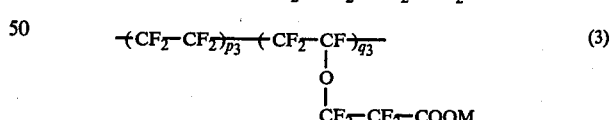   (3)

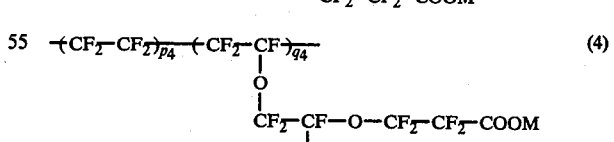   (4)

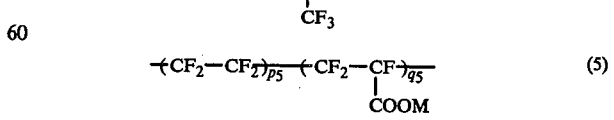   (5)

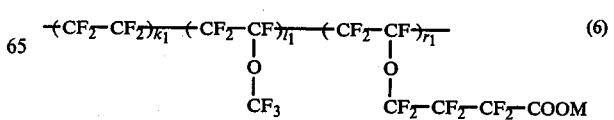   (6)

-continued

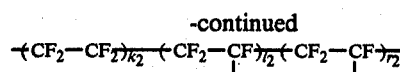  (7)

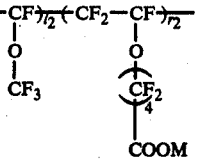

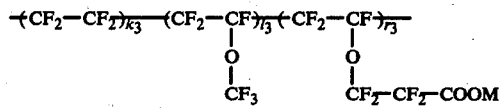  (8)

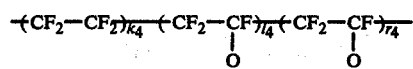  (9)

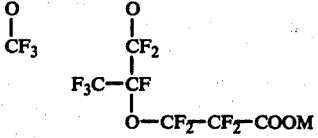

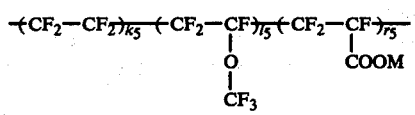  (10)

The copolymer have preferably carboxylic groups at a ratio of one per 220 to 2700 of the molecular weight.

C) Sulfonic acid and carboxylic acid type fluorinated polmers:

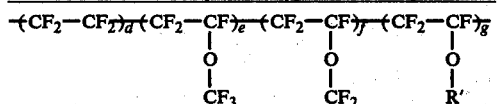

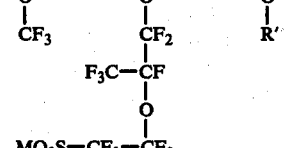

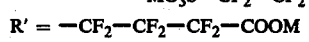

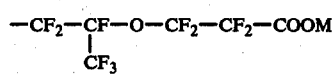

M=H, or alkali metal such as Na, K.
(d +e)/f = 0.5-17 preferably 1-13;
(d + e)/g = 0.3-14 preferably 0.8-8;
f/g = 0.2-2.2 preferably 0.25-1.8.
such as;

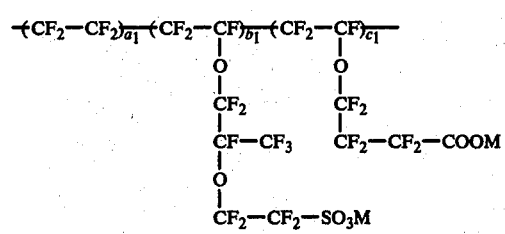  (1)

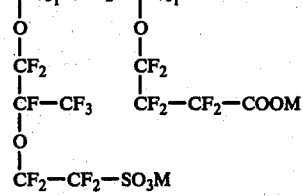

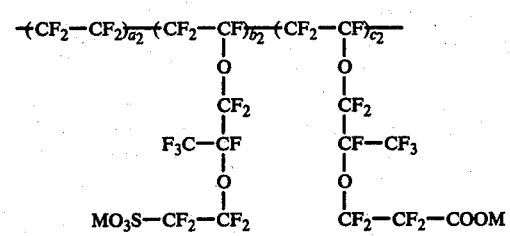  (2)

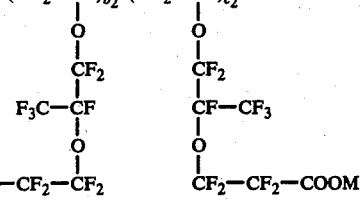

-continued

  (3)

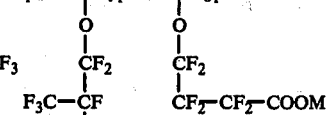

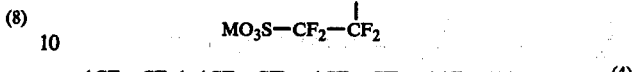  (4)

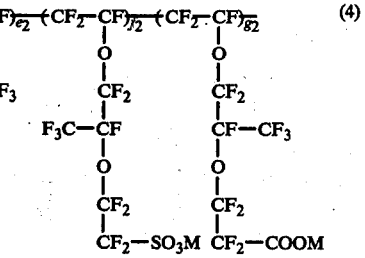

The copolymer have preferably sulfonic acid groups at a ratio of one per 700 to 4300 of the molecular weight and carboxylic groups at a ratio of one per 480 to 2600 of the molecular weight. These examples of the units for the fluorinated polymers having cation-exchangeable groups are only schematic illustrations and the combinations of the units can be decided by the copolymerizations of the monomers.

The typical monomers are as follows:

Monomers having a cation-exchangeable group or a functional group which can be converted to cation-exchangeable group.

$CF_2=CF-(O-(CF_2)_h)_{h_1}-Z$, $CF_2=CF-(O-(CF_2-CF-O)_{h_2})_{h_3}-CF_2-CF_2-A'$
$\hspace{3.2cm}|$
$\hspace{3.2cm}X_1$ $CF_2=CF-(CF_2)_{h_4}-Z$ $Z = -CN, -COF, -COOH, -COOR_1, -COOM$ or $-CONR_2R_3$
$R_1 = C_1 - C_{10}$ alkyl group;
$R_2, R_3 = H$, or $R_1$;
$M$ = alkali metal;
$A' = -SO_2X', -COX'$;
$X' = F$ or $-OY$;
$Y = H, M, NH_4$, or $R_1$;
$X_1 = F, -CF_3$ or $-CF_2-O-CF_3$;
$h = 2$ to 12;
$h_1 = 0$ or 1; $h_2 = 0$ or 1 to 5; $h_3 = 0$ or 1;
$h_4 = 1$ to 5.

Monomers which have not a cation-exchangeable group or a functional group being converted to a cation-exchangeable group and can be copolymerized with said monomer.

$CF_2=CF_2$
$CF_2=CF-CF_3$
$CF_2=CF-O-(CF_2-CF-O)_{\overline{h}}R_f$
$\hspace{3.2cm}|$
$\hspace{3.2cm}X_1$ $CF_2=CF-C-R_f'$
$\hspace{2.2cm}\|$
$\hspace{2.2cm}O$ $R_f = -C_6F_5, -CF_2X''$
$X_1 = -F, -CF_3, -CF_2-O-CF_3$;

X" = —F or $C_1$-$C_5$ perfluoroalkyl group;
$R_f'$ = $C_1$-$C_5$ perfluoroalkyl group;
i = 0 or 1 to 5.

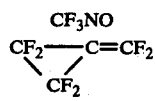
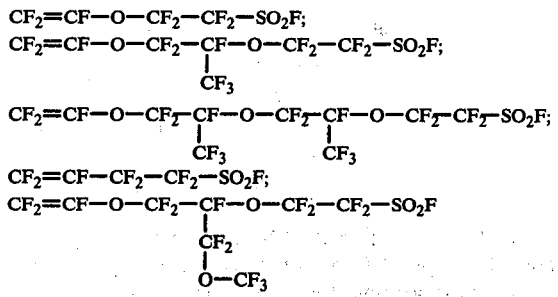

Suitable typical fluorinated monomers include

A group:

$CF_2=CF-O-CF_2-CF_2-SO_2F$;
$CF_2=CF-O-CF_2-CF(CF_3)-O-CF_2-CF_2-SO_2F$;
$CF_2=CF-O-CF_2-CF(CF_3)-O-CF_2-CF(CF_3)-O-CF_2-CF_2-SO_2F$;
$CF_2=CF-CF_2-CF_2-SO_2F$;

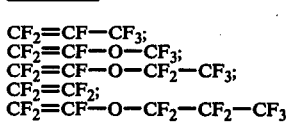

B group:

$CF_2=CF-O-CF_2-CF_2-COF$;
$CF_2=CF-O-CF_2-CF_2-CF_2-COF$;
$CF_2=CF-O-CF_2-CF_2-CF_2-CF_2-COOCH_3$
$CF_2=CF-O-CF_2-CF(CF_3)-O-CF_2-CF_2-COF$;
$CF_2=CF-COOCH_3$;
$CF_2=CF-O-CF_2-CF_2-CF_2-COOCH_3$

C group:

$CF_2=CF-CF_3$;
$CF_2=CF-O-CF_3$;
$CF_2=CF-O-CF_2-CF_3$;
$CF_2=CF_2$;
$CF_2=CF-O-CF_2-CF_2-CF_3$

The monomers in A group are used for introducing sulfonic acid groups. The monomers in B group are used for introducing carboxylic acid groups. The monomers in C group are used for copolymerization with the monomer in A group and/or B group.

The other cation-exchange membranes used in the present invention are prepared by the immersing method.

The followings are typical examples for preparing the cation-exchange membranes by the immersing method.

(1) One or more monomer in B group with or without the monomer in C group is absorbed in the sulfonic acid type cation-exchange membrane and is polymerized and hydrolyzed to introduce carboxylic acid groups.

Suitable monomers in B group include $CF_2=CF-O-CF_2-CF_2-CF_2-COF$;
$CF_2=CF-O-CF_2-CF(CF_3)-O-CF_2-CF_2-COF$;
$CF_2=CF-O-CF_2-CF_2-CF_2-COOCH_3$.

Suitable monomers in C group include $CF_2=CF_2$;
$CF_2=CF-O-CF_3$;
$CF_2=CF-O-CF_2-CF_2-CF_3$.

(2) One or more monomer in A group with or without the monomer in C group is absorbed in the carboxylic acid type cation-exchange membrane and is polymerized and hydrolyzed to introduce sulfonic acid groups.

Suitable monomers in A group include $CF_2=CF-O-CF_2-CF(CF_3)-O-CF_2-CF_2-SO_2F$ Suitable monomers in C group include $CF_2=CF_2$.

These cation-exchange membranes can be reinforced with a reinforcing materials such as glass fiber cloth, polyester fiber cloth, fluorinated polymer fiber cloth for improving characteristics of the membrane. In the preparation of the reinforced membrane, the cloth can be inserted before or after the polymerization of the fluorinated monomers.

The surface or a part of the fluorinated polymer membrane can be chemically modified such as amination.

The fluorinated polymer membranes can be used in the following conditions.

(1) The fluorinated polymer membrane is swollen with a water miscible organic solvent and the solvent is removed under a reduced pressure or the atmospheric pressure.

(2) The fluorinated polymer membrane is swollen with a water miscible organic solvent and the swollen membrane is heat-treated.

(3) The fluorinated polymer membrane is not treated with such a solvent as the process (1) or (2).

The water miscible organic solvents used in the treatment of the present invention should swell the membrane treated and have more than 0.1 g/100 g $H_2O$ of a solubility to water and are preferably the organic solvents which rapidly swell the membrane and are easily vaporized to be removed from the membrane.

Suitable water miscible organic solvents include aliphatic monohydric alcohols such as methanol, ethanol, propanol, butanol; ketones such as acetone, methyl ethyl ketone, diethyl ketone; esters such as methyl acetate, ethyl acetate, propyl acetate; aliphatic ethers such as ethyl ether, propyl ether; tetrahydrofuran, dioxane and chloroform.

The organic solvents can be used as mixtures thereof. It is also possible to contain the other solvent which swells the membrane but does not affect for improving the characteristics of the membrane such as water.

In the swelling operation, the membrane is dipped in the water miscible organic solvent so as to be swollen. The condition is not limited and can be the temperature from 0° C. to the boiling point of the solvent.

In the solvent removing operation, the organic solvent from the membrane can be removed by heating or drying under a gas flow of air, nitrogen gas or other inert gas, drying in vacuum or other conventional processes.

The cation-exchange membrane is usually swollen with the above-mentioned water miscible organic solvent and then, the solvent is removed from the membrane.

The degree of swelling which is a percentage of an increased weight of the swollen membrane to the weight of the dry membrane is more than 3 wt.%, preferably more than 5 wt.%.

It is preferable to remove the organic solvent by evaporating it under heating so as to complete the annealing of the membrane.

It is especially preferable to hold the membrane impregnating the organic solvent between a pair of smooth plates such as glass plates, polytetrafluoroethylene plates, stainless steel plates with or without wiping out the surface of the membrane and then to evaporate it under heating the swollen membrane so as to complete the annealing of the membrane and to hold the shape of the membrane without deformation.

The heat treatment for removing the organic solvent can be in a range of higher than the room temperature to 200° C. and preferably 60 to 150° C. When the temperature is higher, the resistance for permeation of the membrane is increased.

In order to introduce lactone rings in the fluorinated polymer membrane having cation-exchangeable groups, the membrane treated by immersing the vinyl monomer having lactone ring and/or the lactonizable diolefin monomer with or without a crosslinking agent or a polymerization initiator into the membrane and polymerizing the monomer.

Suitable vinyl monomers having lactone ring include the monomers having the formula

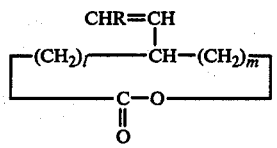

wherein l is an integer of 0 to 4; m is an integer of 0 to 4; l + m is at least 1 and R represents H, or $C_1$-$C_3$ alkyl group; such as

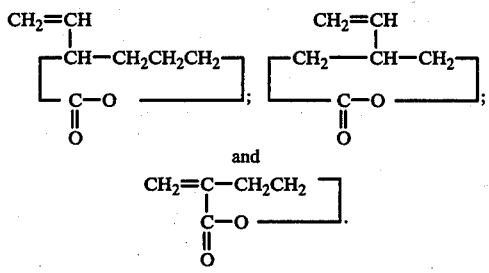

Suitable lactonizable diolefin monomers include $CH_2=CRCO_2CH_2CH=CH_2$ $CH_2=CHCH_2—CO_2—CH_2CH=CH_2$ wherein R represents hydrogen atom or methyl group. When the polymer formed by polymerizing the monomer may be dissolved, it is preferable to add a crosslinking agent.

Suitable crosslinking agents include diolefins such as divinyl benzene, butadiene and fluorinated diolefins such as

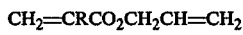

wherein n is an integer of 1 to 3.

The solution containing the monomer and the crosslinking agent is prepared and a radical polymerization initiator such as benzoyl peroxide is added. The fluorinated polymer membrane having the cation-exchangeable groups is dipped into the solution at −10° C. to 100° C. preferably 20 to 60° C. for 5 minutes to 50 hours.

The immersed membrane is treated to polymerize the monomer at 60° C. to 200° C. preferably 80° C. to 150° C. for 1 hour to 50 hours.

In the process for immersing the monomer into the membrane, suitable solvent can be used.

Suitable solvents include alcohols such as methanol, ethanol; aliphatic ethers such as diethyl ether, methyl ethyl ether; cyclic ethers such as tetrahydrofuran, dioxane, etc.

The polymerization of the monomer immersed in the membrane can be performed by using a radical polymerization initiator or a thermal polymerization.

When the resulting cation-exchange membrane is swollen with a water miscible organic solvent and then, the solvent is removed from the membrane, the effect is further improved. The water miscible organic solvent can be the above-mentioned ones.

The degree of swelling which is a percentage of an increased weight of the swollen membrane to the weight of the dry membrane is more than 3 wt.%, preferably more than 5 wt.%. The degree of swelling can be controlled by selecting the types and amount of the monomer and the solvent.

In the swelling step, the resulting membrane is dipped into the water miscible organic solvent at 0° C. to the boiling point of the solvent and preferably room temperature. The solvent is removed from the membrane after swelling the membrane, in air, nitrogen gas or the other inert gas flow or in vacuum or by a heat treatment.

The heat treatment can be carried out by treating the swollen membrane in hot air.

It is especially preferable to hold the membrane impregnating the organic solvent between a pair of smooth plates such as glass plates, polytetrafluoroethylene plates, stainless steel plates. It is preferable to heat 40 to 200° C. especially 60 to 150° C. When the temperature is too high, the electric resistance of the membrane may be increased. The permeability of hydroxyl group ions through the cation-exchange membrane is lowered by the treatment of the present invention.

In usual, the fluorinated polymers having no functional group are water-repellent and oil-repellent. The base of the membrane may have the tendency of water-repellent and oil-repellent. However, the affinity of the membrane to the water miscible organic solvent is increased because of the high hydrophylic property of the cation-exchangeable groups in the membrane whereby the membrane is swollen. When the solvent is removed from the swollen membrane, the arrangement of the base cation-exchangeable groups is affected to effectively decrease the permeation of hydroxyl group ions.

The base cation-exchange membrane is non-crosslinking type whereby the arrangement of the cation-exchangeable groups is easily changed during a long time operation because of swelling. Accordingly, it is preferable to fix the desired arrangement of the base cation-exchangeable groups.

The present invention will be further illustrated by certain examples.

In the examples, the cation transport number of the membrane was measured by the Nernst's formula from membrane potential between 0.5N-NaOH and 2.5N-NaOH.

The electric resistance of the membrane was measured by the AC bridge method at 1000 C/S in 2.0% aqueous solution of sodium hydroxide at 25° C.

EXAMPLE 1

A fluorinated polymer membrane having a thickness of 0.25 mm and a structure

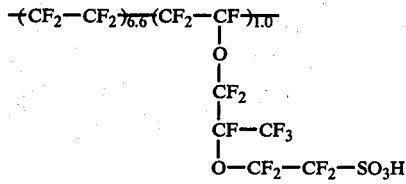

was used.

The fluorinated polymer membrane can be prepared by copolymerizing tetrafluoroethylene and a monomer

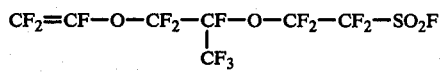

and molding the resulting copolymer and hydrolyzing it.

The electric resistance of the membrane was 2.0Ωcm$^2$ and the cation transport number of the membrane was 82%.

The membrane was dipped into a solution of 30 wt. parts of β-vinyl-γ-butyrolactone, 2 wt. parts of divinyl benzene and 68 wt. parts of diethyl ether at 25° C. for 4 hours.

The membrane was taken out and the surface of the membrane was wiped off and the membrane was held between a pair of glass plates and the membrane was heated at 90° C. for 25 hours to polymerize the monomers.

The resulting cation-exchange membrane had the electric resistance of 2.6Ωcm$^2$ and the cation transport number of 94%.

EXAMPLE 2

The fluorinated polymer membrane of Example 1 was dipped into a solution of 15 wt. parts of allyl acrylate, 0.5 wt. parts of 1-chlorobutadiene and 84.5 wt. parts of diethyl ether at 25° C. for 6 hours.

The membrane was treated in accordance with the process of Example 1 to prepare a cation-exchange membrane.

The resulting cation-exchange membrane had the electric resistance of 2.8Ωcm$^2$ and the cation transport number of 95%.

EXAMPLE 3

The fluorinated polymer membrane of Example 1 was dipped at 25° C. for 6 hours into a solution of 25 wt. parts of β-vinyl-γ-butyrolactone, 1 wt. part of 1-chlorobutadiene and 74 wt. parts of diethyl ether to which 0.03 wt.% of benzoyl peroxide was added.

The membrane was taken out and the surface of the membrane was wiped off and the membrane was held between a pair of glass plates and the membrane was heated at 80° C. for 20 hours to polymerize the monomers.

The resulting cation-exchange membrane had the electric resistance of 2.8Ωcm$^2$ and the cation transport number of 96%.

EXAMPLE 4

A teflon fiber reinforced cation-exchange membrane having two layers of A and B was used.

A layer: thickness of 0.05 mm structure

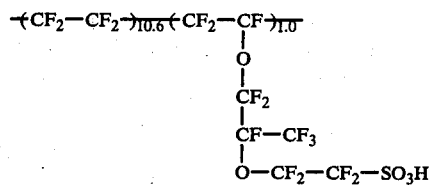

B layer: thickness of 0.10 mm structure

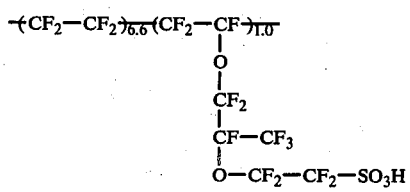

The membrane had the electric resistance of 5.6μcm$^2$ and the cation transport number of 90%.

The membrane was dipped into a solution of 25 wt. parts of β-vinyl-γ-butyrolactone, 1 wt. part of 1-chlorobutadiene and 74 wt. parts of diethyl ether at 30° C. for 6 hours.

The membrane was treated in accordance with the process of Example 1 to prepare a cation-exchange membrane.

The resulting cation-exchange membrane had the electric resistance of 4.8μcm$^2$ and the cation transport number of 95.5%.

EXAMPLE 5

The fluorinated polymer membrane of Example 4 was dipped into a solution of 15 wt. parts of allyl acrylate, 2 wt. parts of divinyl benzene and 83 wt. parts of diethyl ether at 30° C. for 5 hours.

The membrane was treated in accordance with the process of Example 1 to prepare a cation-exchange membrane.

The resulting cation-exchange membrane had the electric resistance of 5.0μcm$^2$ and the cation transport number of 97%.

EXAMPLE 6

The fluorinated polymer membrane of Example 1 was dipped into ethanol at the room temperature for 24 hours and the membrane was taken out and it was held between a pair of glass plates and it was heated at 85° C. for 24 hours.

The resulting membrane was dipped into the solution of β-vinyl-γ-butyrolactone of Example 1 at 25° C. for 4 hours. The membrane was taken out and the surface of the membrane was wiped off and the membrane was held between a pair of glass plates and it was heated at 90° C. for 25 hours to polymerize the monomers.

The resulting cation-exchange membrane had the electric resistance of 2.2μcm$^2$ and the cation transport number of 94%.

EXAMPLE 7

In accordance with the process of Example 1, the fluorinated polymer membrane of Example 1 was treated with ethanol and dipped into the solution of allyl acrylate of Example 2 at 25° C. for 6 hours, and then, it was treated by the process of Example 1 to prepare a cation-exchange membrane.

The resulting cation-exchange membrane had the electric resistance of 2.3μcm$^2$ and the cation transport number of 94%.

EXAMPLE 8

In accordance with the process of Example 6, the fluorinated polymer membrane of Example 1 was treated with ethanol and dipped into the solution of β-vinyl-γ-butyrolactone with 0.03 wt. % of benzoyl peroxide at 25° C. for 6 hours, and then, it was treated by the process of Example 3 to prepare a cation-exchange membrane.

The resulting cation-exchange membrane had the electric resistance of 2.4μcm$^2$ and the cation transport number of 96%.

EXAMPLE 9

The fluorinated polymer membrane of Example 4 was dipped into methanol at the room temperature for 24 hours and the membrane was taken out and it was held between a pair of glass plates and it was heated at 80° C. for 24 hours.

The resulting membrane was dipped into the solution of β-vinyl-γ-butyrolactone of Example 4 at 30° C. for 6 hours and the membrane was treated by the process of Example 1 to prepare a cation-exchange membrane.

The resulting cation-exchange membrane had the electric resistance of 4.2μcm$^2$ and the cation transport number of 95%.

EXAMPLE 10

In accordance with the process of Example 9, the fluorinated polymer membrane of Example 4 was treated with methanol and dipped into the solution of allyl acrylate of Example 5 at 30° C. for 5 hours and then, it was treated by the process of Example 1 to prepare a cation-exchange membrane.

The resulting cation-exchange membrane had the electric resistance of 4.5μcm$^2$ and the cation transport number of 97%.

EXAMPLE 11

A copolymer of tetrafluoroethylene and a monomer having the formula $$CF_2=CF-O-(CF_2)_3-COOCH_3$$

was molded in a form of membrane and then, it was hydrolyzed to obtain a carboxylic acid type cation-exchange membrane (thickness: 0.2 mm).

The membrane had a structure

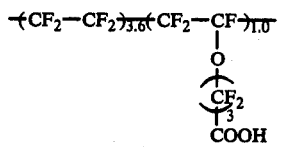

The membrane was dipped into methanol for 30 hours and the membrane was held between a pair of glass plates and it was heated at 95° C. for 4 hours.

The membrane was dipped into methanol at the room temperature for 30 minutes for 24 hours and the membrane was taken out and it was held between a pair of glass plates and it was heated at 95° C. for 4 hours.

The resulting membrane was dipped into the solution of β-vinyl-γ-butyrolactone of Example 1 at 25° C. for 4 hours. The membrane was taken out and the surface of the membrane was wiped off and the membrane was held between a pair of glass plates and it was heated at 90° C. for 24 hours to polymerize the monomers.

The resulting cation-exchange membrane had the electric resistance of 2.5μcm$^2$ and the cation transport number of 97.7%.

The untreated cation-exchange membrane had the electric resistance of 2.1μcm$^2$ and the cation transport number of 89.0%.

EXAMPLE 12

A terpolymer of tetrafluoroethylene and a monomer having the formula $$CF_2=CF-O-(CF_2)_3-COOCH_3$$

and a monomer

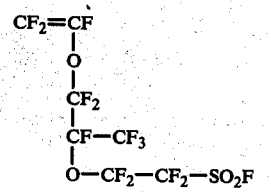

was molded in a form of membrane and it was hydrolyzed to obtain a sulfonic acid-carboxylic acid type cation-exchanged membrane (thickness: 0.19 mm). The membrane had a structure

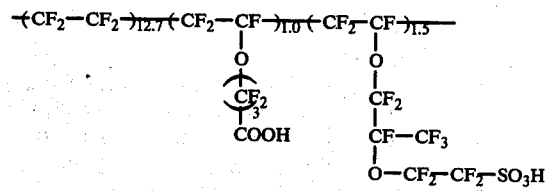

The membrane was dipped into methanol for 5 hours and the membrane was held between a pair of glass plates and it was heated at 85° C. for 10 hours.

The membrane was dipped into methanol at the room temperature for 5 hours and the membrane was taken out and it was held between a pair of glass plates and it was heated at 85° C. for 10 hours.

The resulting membrane was dipped into a solution of β-vinyl-γ-butyrolactone of Example 1 at 25° C. for 4 hours and the membrane was treated by the process of Example 1 to prepare a cation-exchange membrane.

The resulting cation-exchange membrane had the electric resistance of 2.5μcm$^2$ and the cation transport number of 97.4%.

The untreated cation-exchange membrane had the electric resistance of 2.0μcm$^2$ and the cation transport number of 88%.

EXAMPLE 13

The fluorinated polymer membrane of Example 4 was dipped into methanol at the room temperature for 24 hours and the membrane was taken out and it was held between a pair of glass plates and it was heated at 80° C. for 24 hours.

The resulting membrane was dipped into the solution of β-vinyl-γ-butyrolactone of Example 4 at 30° C. for 6 hours.

The membrane was taken out and the surface of the membrane was wiped off and the membrane was held between a pair of glass plates and it was heated at 85° C. for 24 hours. The membrane was further dipped into methanol and it was taken out and held between a pair of glass plates and heated at 85° C. for 24 hours.

The resulting cation-exchange membrane had the electric resistance of 5.2μcm² and the cation transport number of 98.4%.

EXAMPLES 14, 15 AND REFERENCE:

An electrolytic cell having 30 cm × 30 cm of effective area was prepared by using the cation-exchange membrane as the diaphragm for partitioning an anode compartment and a cathode compartment.

An aqueous solution of sodium chloride having 310 g/l of concentration was fed to the anode compartment at a rate of 7418 g per hour and water was fed to the cathode compartment so as to give 20% of the concentration of sodium hydroxide at the outlet of the cathode compartment and the electrolysis was carried out by feeding 180 amp. of current.

The membrane prepared in Examples 9 and 13 were used as the cation-exchange membranes. The untreated membrane of Example 4 was used as Reference.

|  | Membrane | Electrolytic voltage (volt) | Current efficiency (%) |
|---|---|---|---|
| Exp. 14 | Exp. 9 | 3.6 | 90 |
| Exp. 15 | Exp. 13 | 3.7 | 92 |
| Ref. | Untreated in Exp. 4 | 4.1 | 87 |

What is claimed is:

1. A process for preparing a cation-exchange membrane which comprises swelling a fluorinated polymer membrane having cation-exchangeable groups in a water miscible organic solvent and removing said solvent and then, immersing a monomer having lactone ring and/or a lactonizable monomer with or without a crosslinking agent or a polymerization initiator into the treated membrane.

2. A process according to claim 1 wherein the membrane prepared by the polymerization is further treated by swelling it in a water miscible organic solvent and removing the solvent from the membrane.

3. A process according to claim 1 wherein said water miscible solvent is miscible to water in at least 0.1 g/100 g H₂O of solubility.

4. A process to claim 2 wherein said water miscible solvent is miscible to water in at least 0.1 g/100 g H₂O of solubility.

5. A process according to claim 1 wherein said organic solvent is removed in vacuum or under the atmospheric pressure at an elevated temperature.

6. A process according to claim 1 wherein said water miscible solvent is selected from the group consisting of aliphatic alcohols, esters, ketones, ethers and chloroform.

7. A process according to claim 1 wherein said fluorinated polymer membrane has sulfonic acid groups and/or carboxylic acid groups as said cation-exchangeable groups after hydrolysis.

8. A process according to claim 1 wherein said monomer having lactone ring is a monomer having the formula

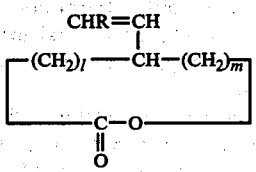

wherein l is an integer of 0 to 4; m is an integer of 0 to 4; l + m is at least 1 and R represents H, or C₁-C₃ alkyl group, or a monomer having the formula

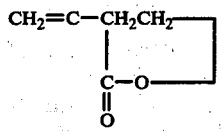

or said lactonizable monomer is a monomer having the formula

wherein R represents hydrogen atom or methyl group.

UNITED STATES PATENT AND TRADEMARK OFFICE
CERTIFICATE OF CORRECTION

PATENT NO. : 4,136,237
DATED : January 16, 1979
INVENTOR(S) : Kenji Takahashi et al It is certified that error appears in the above-identified patent and that said Letters Patent are hereby corrected as shown below:

Please correct the Priority Data to read as follows:

DELETE: [30] "September 14, 1976 Japan... 51-109346"

INSERT: [30] --September 14, 1976 Japan... 51-109436 --.

Signed and Sealed this

Fourth Day of September 1979

[SEAL]

Attest:

LUTRELLE F. PARKER
*Attesting Officer*    *Acting Commissioner of Patents and Trademarks*